United States Patent [19]
Yang

[11] Patent Number: 5,286,066
[45] Date of Patent: Feb. 15, 1994

[54] QUICK PIPE COUPLING

[76] Inventor: Ming-Tung Yang, No. 4-3, Lane 97, Lung Chuan St., Taipei Hsien, Taiwan

[21] Appl. No.: 871,516

[22] Filed: Apr. 21, 1992

[51] Int. Cl.⁵ .............................................. F16L 55/00
[52] U.S. Cl. ...................................... 285/23; 285/105; 285/305
[58] Field of Search ............... 285/104, 105, 97, 107, 285/305, 23

[56] References Cited

U.S. PATENT DOCUMENTS

| | | | |
|---|---|---|---|
| 3,420,554 | 1/1969 | Straub | 285/97 |
| 3,480,043 | 11/1969 | Proudfoot et al. | 285/97 X |
| 4,373,377 | 2/1983 | Smith et al. | 285/97 X |
| 5,160,175 | 11/1992 | Yang | 285/105 |

FOREIGN PATENT DOCUMENTS 1443237  5/1966  France ................. 285/109

Primary Examiner—Dave W. Arola
Attorney, Agent, or Firm—Bacon & Thomas

[57] ABSTRACT

The present invention relates to a quick pipe coupling comprising a tight binding assembly set installed inside of the coupling and an anti-reverse pushing assembly set installed at the opening of the coupling for an easy, fast and convenient operation for connection which is further characterized by the distinctive reversibility of the connected pipes.

6 Claims, 8 Drawing Sheets

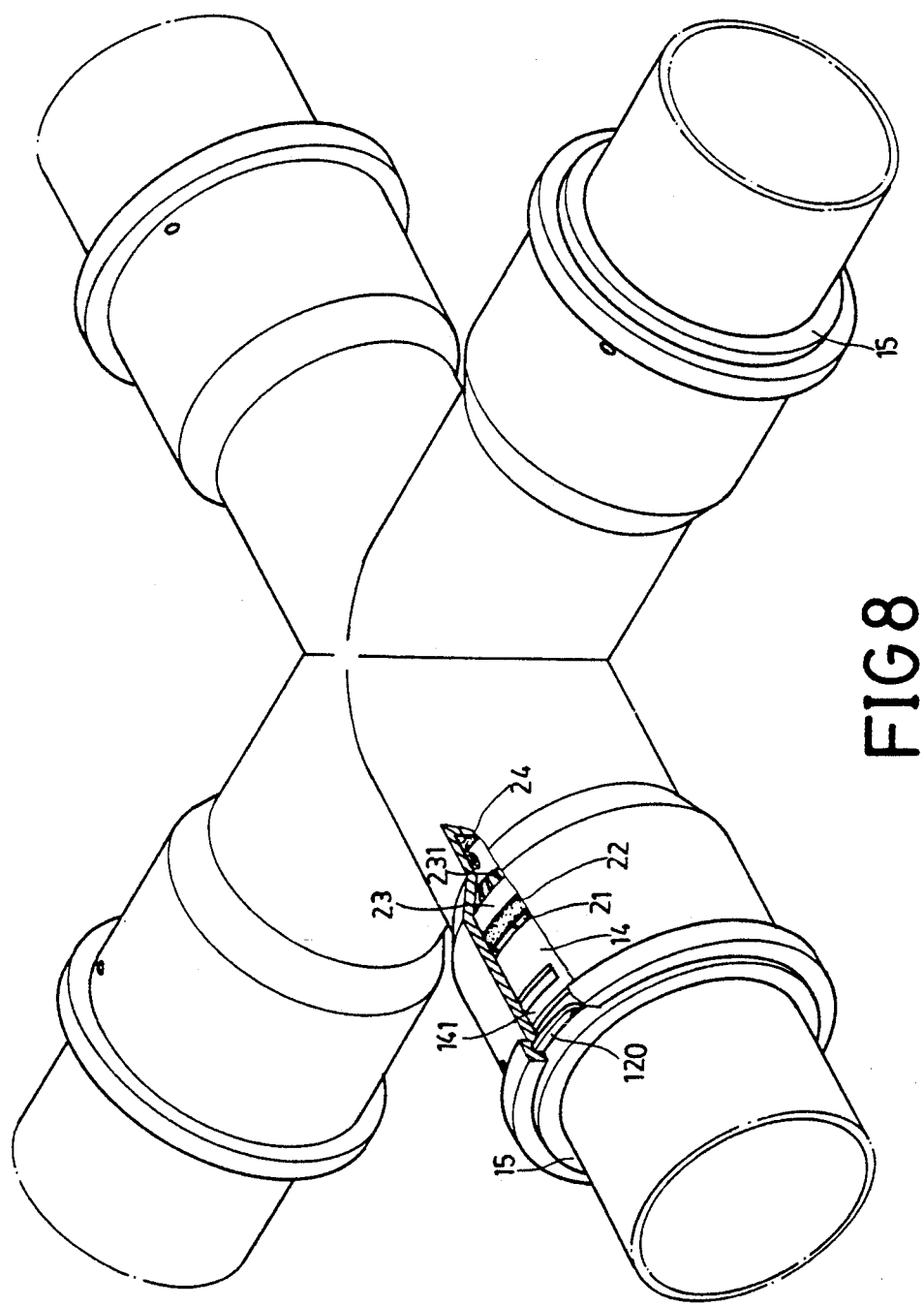

QUICK PIPE COUPLING

BACKGROUND OF THE INVENTION

There are many different kinds and models of the pipe coupling devices on the market, however, creative and novel product is still hardly seen. Accordingly, the structures and effects of these conventional coupling devices are limited in a narrow range which can greatly decrease the efficiency of performance. In some advance countries, there were developed the compressing coupling device, but disadvantages of the device were still found in the operation. Therefore the present inventor had designed a quick pipe coupling which is filed as U.S. patent application No. 07/748,507, now Pat. No. 5,160,175 issued Nov. 3, 1992, for use in this field; and now, a further coupling which can be produced by simple molding equipment to lower the cost and is featured with its reversibility has been developed by the inventor expecting to enhance the structure of the original invention so as to be even more practical.

It is therefore the main object of the present invention to provide a quick pipe coupling with a concise structure which can connect the pipes quickly, easily, and tightly and furthermore, with a feature of reversibility to prevent any loss due to inappropriate operation.

It is another object of the present invention to provide a quick pipe coupling that has an anti-reverse pushing assembly set in which the releasable ring can be pushed inwards by pre-inflated pressure and the curved fins provided on the releasable ring with reverted indenture at the edge are used for holding protrudent teeth of the lock ring so as to achieve an anti-reverse one way pushing process. By releasing the fastened condition of the lock ring, the whole anti-reverse pushing assembly can be removed as performing the reversibility of the present invention.

It is a further object of the present invention to provide a quick pipe coupling that has a tight binding assembly set in which the projecting toothed ring and the con-press clamping rings, when they are pushed by force, can bind the pipe which is to be connected from the outer surface; in the same time, a soft and hollow squeezing ring forced by the push from outwards will be squeezed to press against the inner wall of the coupling and the outer wall of the pipe. Moreover, as the pipe is inserted into the coupling, the flexible folding circular valve provided at the inner terminal of the coupling will be folded to fasten the pipe firmly and performs as well a tight leak proof effect.

SUMMARY OF THE INVENTION

The quick pipe coupling of the present invention relates to a coupling structure used specifically for the connection of pipes or lines. The quick pipe coupling comprises an anti-reverse pushing assembly set and a tight binding assembly set. With the pre-inflated pressure in the inflated hose, the coupling of the present invention can achieve the connection of pipes easily and fast as the cross pin is removed. The tight binding assembly set provided inside the coupling and the anti-reverse pushing assembly set designed at the opening of the coupling together perform the distinctive reversibility of the present invention to prevent any possible loss causes by unproper operation.

BRIEF DESCRIPTION OF THE DRAWINGS

FIG. 8 is a further embodiment of the present invention as a four-way coupling.

DETAILED DESCRIPTION OF THE PREFERRED EMBODIMENT

Figure 1:
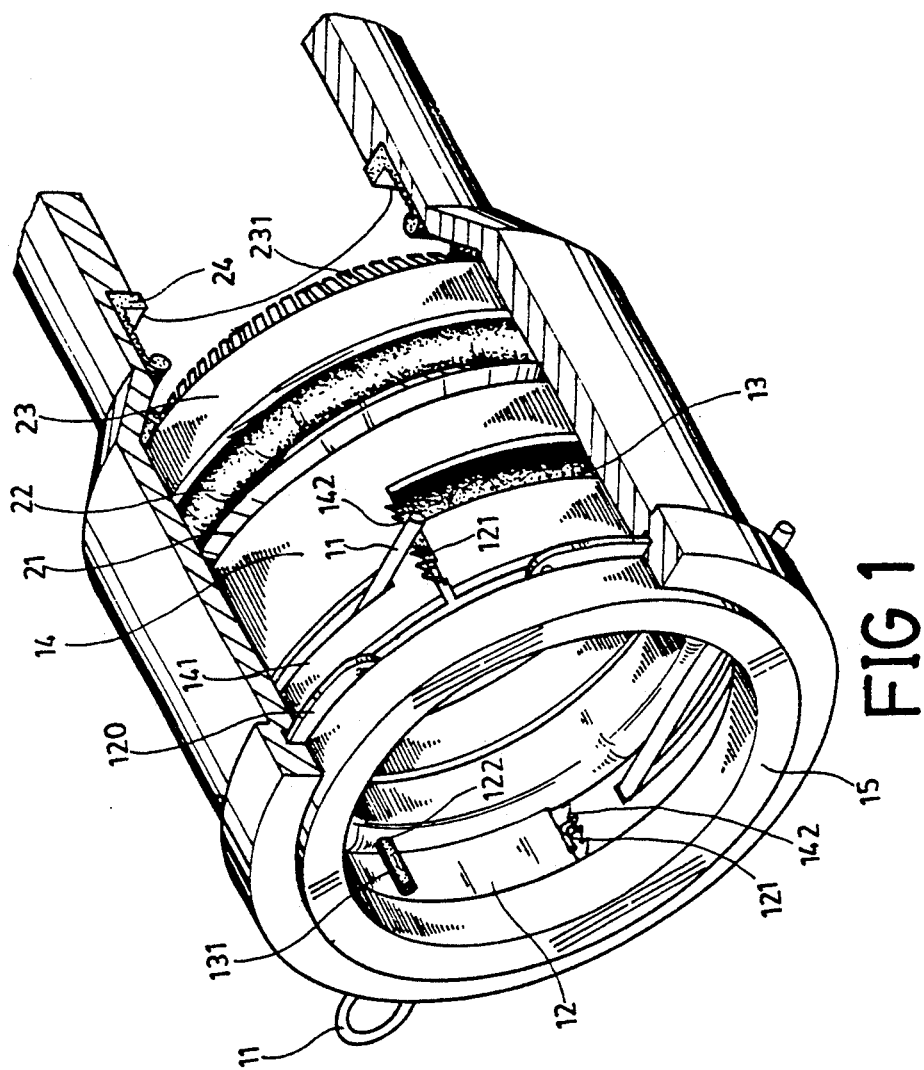
FIG. 1 is a partially side-sectional perspective view after assembling.
Figure 2:
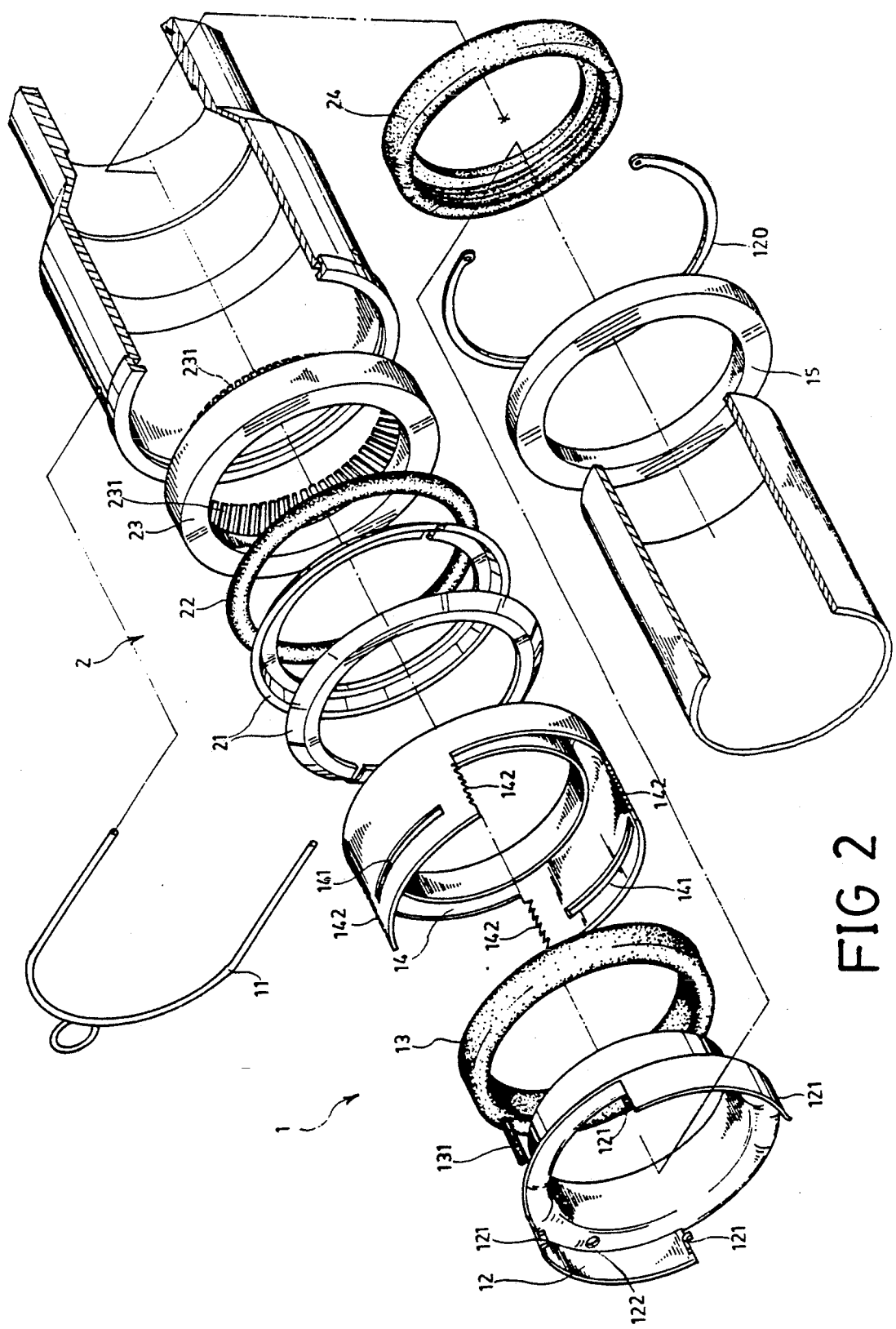
FIG. 2 is a disassembled perspective view of the assembly sets of the present invention.
Figure 3:
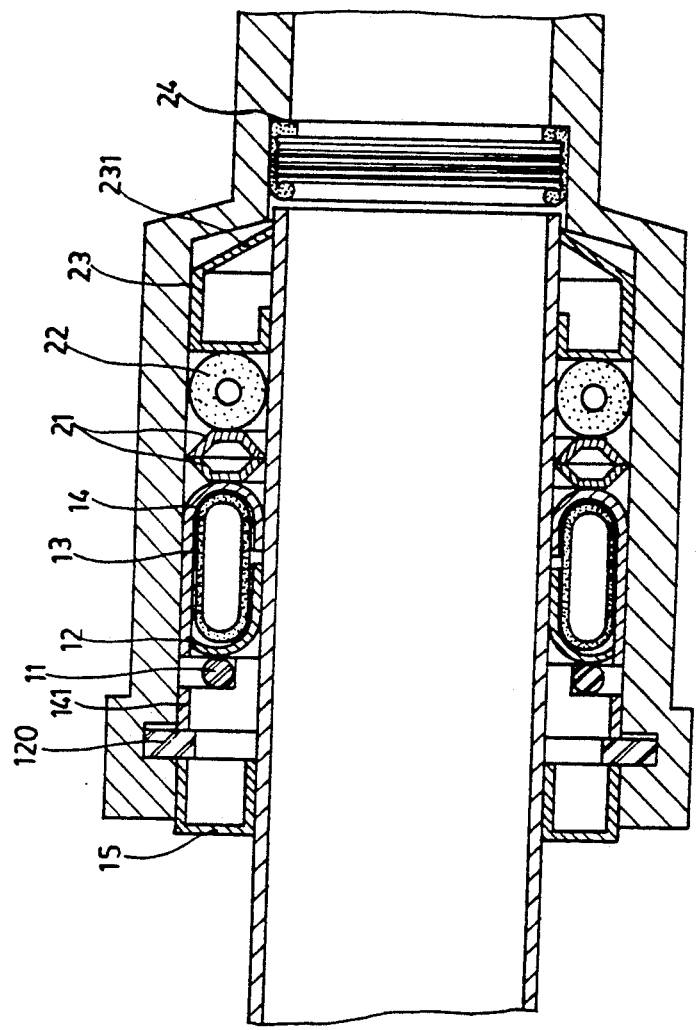
FIG. 3 is a side-sectional plan view showing the present invention connecting a pipe.

Please refer to FIGS. 1, 2, and 3, it is seen that the quick pipe coupling of the present invention is designed specifically for the connection of pipes or lines which comprises an anti-reverse pushing assembly set (1) installed at the opening of the coupling and a tight binding assembly set (2) installed inside of the coupling closely next to the anti-reverse pushing assembly set (1). The anti-reverse pushing assembly set (1) is provided with a cross pin (11), a lock ring (12), an inflatable hose (13), and a releasable ring (14) in which the cross pin (11) is attached on the outer surface, and the other assembly are arranged in order as: the lock ring (12), the inflatable hose (13), and the releasable ring (14). The lock ring (12) is fastened by a C-retaining ring (120) received in a circular groove on the inner wall of the coupling, and is provided with two relative curved notches which are formed respectively with a pair of protrude teeth (121) at the edge. At appropriate spot on the lock ring (12), there is formed a punch hole (122); and the surface of the lock ring (12) facing inwards is designed as a shaped groove. The releasable ring (14) is formed as a shaped groove with its opening facing outwards to be opposite with the groove of the lock ring (12) and form thereby a space for receiving the inflatable hose (13); the air valve (131) of the inflatable hose (13) protrudes from the punch hole (122) to the outside of the coupling. On the outer circumference wall of the groove of the releasable ring (14), there are provided two curved fins (141) with appropriate width and facing relatively to extend outside from the two curved notches of the lock ring (12). On both sides of respective curved fin (141), there are further formed into reverted indenture edges (142) used to be stuck by the protrude teech (121) when the curved fins (14) are extending outwards through the lock ring (12), so that the releasable ring (14) can perform as a one-way moving body with bilateral anti-reverse structure.

The tight binding assembly set (2) installed inside of the coupling is provided with a pair of con-press clamping rings (21), a hollow squeezing ring (22), a forcing ring (23), and a flexible folding circular valve (24) in which the clamping rings (21) are installed next to the flat back surface of the releasable ring (14) of the anti-reverse pushing assembly set (1), and thereafter arranged orderly the hollow ring (22), the squeezing ring (23) and the flexible folding circular valve (24). The con-press clamping rings (21) are formed as a shaped structure, and provided respectively on proper spot a notch so that when the squeezing rings are pressed, there is flexible room for the changing of the form to hold against the inner wall of the coupling and the outer surface of the pipe to be connected. The forcing ring (23) is a shaped circular with a row of projecting teeth (231) on the top; when the ring (24) is pushed by a force, the projecting teeth, due to the taper inner surface inside the coupling, will be bended centerwards to bind the pipe inserted to be connected. Accordingly, it is noted that, as the pushing force comes from the anti-reverse pushing assembly set (1) by an inserted pipe, the pair of clamping rings (21) and forcing ring (23) will be forced to change their forms and press the pipe tightly; the soft hollow squeezing ring (22) placed between the clamping rings (21) and the forcing ring (23), on receiving the pushing force, will change its shape from tube-like to flat and fill the space between the coupling and the pipe completely. The flexible folding circular valve (24) installed at the innermost in the coupling, as a pipe is inserted, will be pushed by the front end of the pipe to start folding from its rolled brim to the end and forms a leakproof sealing effect; along with the hollow squeezing ring, a double sealing effect is thereby achieved.

Figure 4:
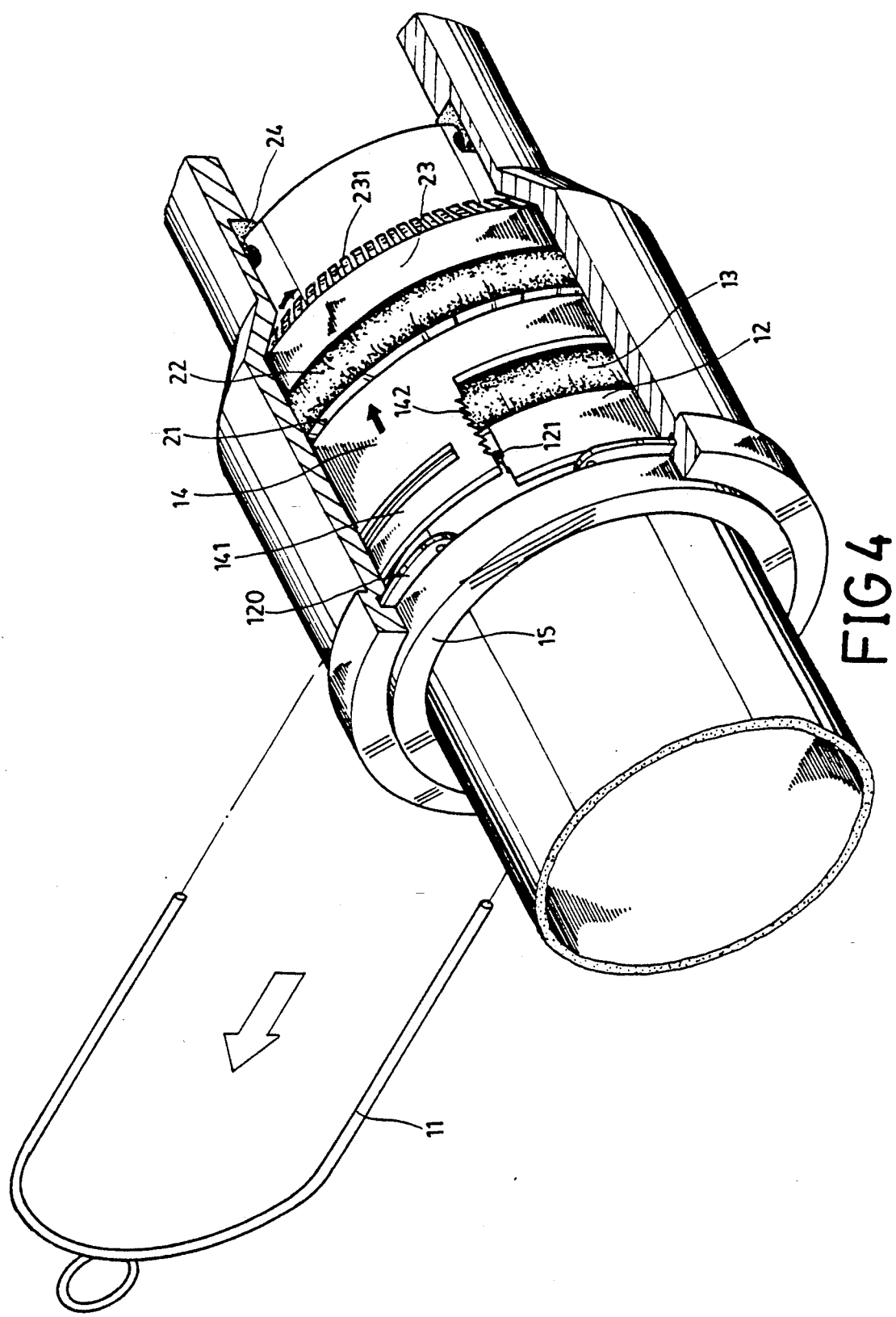
FIG. 4 is a perspective view showing the present invention in the process of connecting a pipe.

The assembly of the whole structure of the quick pipe coupling can be made, before the inflation, by placing the tight binding assembly set (2) into the coupling first and then the anti-reverse pushing assembly set (1); and a drop groove lid (15) can be further attached onto the outermost end of the coupling for a better out-look; the cross pin (11) is used to stick into the coupling from the outer surface and be received by the holding slot (143) provided respectively on the curved fins (141) of the releasable ring (14) to prevent the releasable ring from moving. Thereafter, the inflatable hose (13) can be inflated from the air valve (131) protruding out from the punch hole (122). The pressure from the inflation can be adjusted as needed, however, since the lock ring (12) is fastened by the C-retaining ring (120) and the releasable ring (14) is fastened by the cross pin (11), the inflatable hose (13) placed inbetween can not be extended unlimitedly. As a pipe is inserted into the coupling, as shown in FIG. 4, the cross pin (11) shall be removed; the releasable ring (14) without the fastening of the pin (11) will then be released. While the releasable ring is released and the lock ring (12) is still fastened, the inflated hose (13) with full pressure will force the releasable ring (14) to move inwards; and the reverted indenture edges (142) of the curved fins (141) are gradually moved inwards by the protrude teeth (121) of the lock ring (12) which defines that the releasable ring (14) once is forced to push the tight binding assembly set (2), will not be able to reverse unless the C-retaining ring (120) is removed to release the lock ring (12) for removing the whole anti-reverse pushing assembly set (1). The reversibility of the present invention performed herewith.

Figure 5:
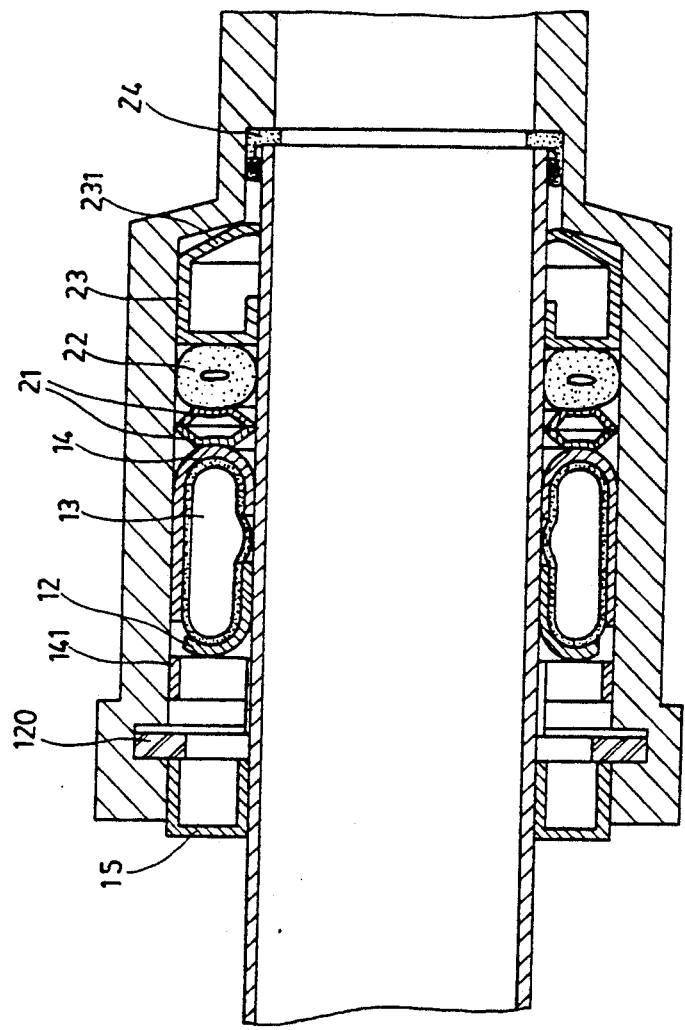
FIG. 5 is another side-sectional view showing the quick pipe coupling of the present invention achieveing the connection of the pipes.
Figure 6:
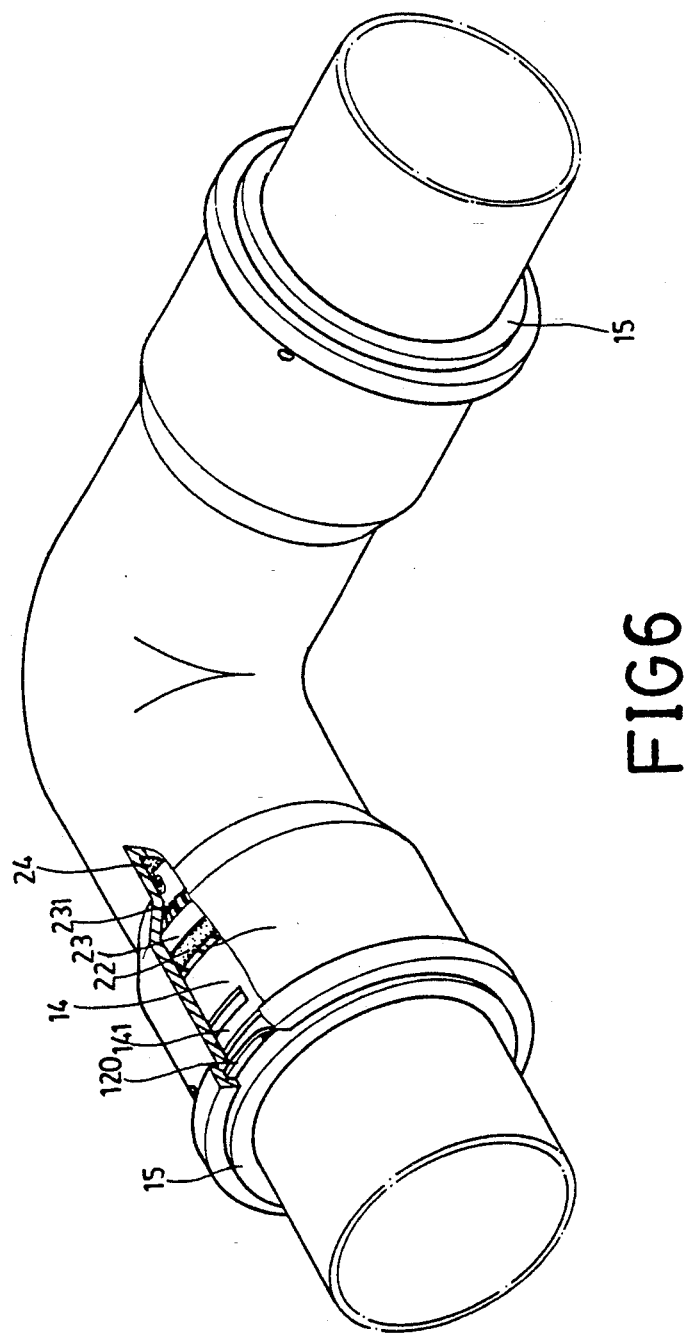
FIG. 6 illustrates an embodiment of the present invention as a right-angle coupling.
Figure 7:
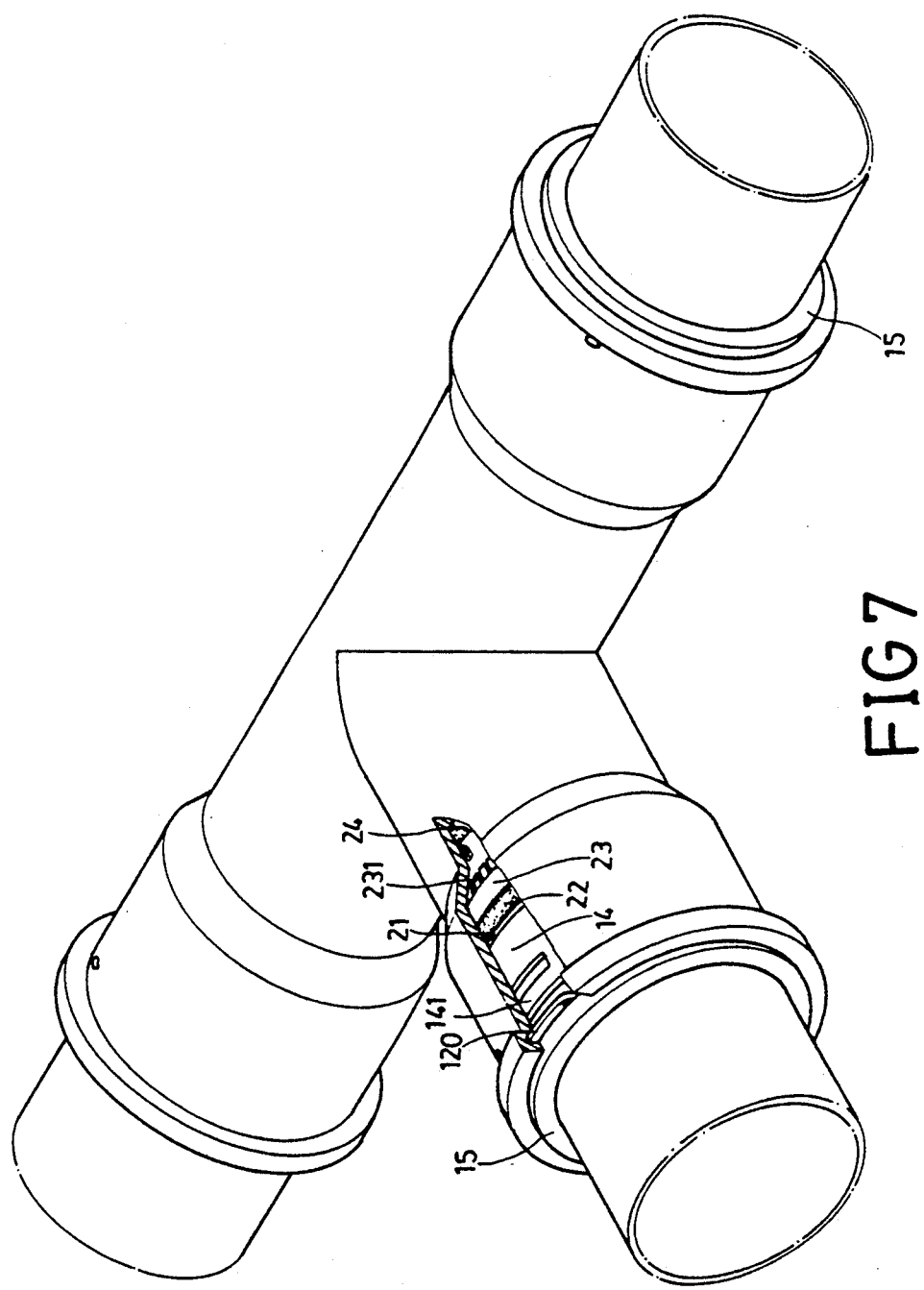
FIG. 7 illustrates another embodiment of the present invention as a three-way coupling.

As the tight binding assembly set (2) is pushed by the releasable ring (14), the clamping rings (21) are forced to press the hollow squeezing ring (22) and expand to press against the coupling and the pipe; the hollow squeezing ring (22) is pressed and changes to a flat form to fill the space between the coupling and the pipe for a sealing effect; the forcing ring (23) next to the squeezing ring (22) is also pushed inwards by the force and the projecting teeth (231) of the forcing ring (23) will all bend centerwards to bind the pipe inserted. The stronger the pressure is, the better the binding effect is to steadily fasten the pipe and achieve the connecting process easily. Furthermore, as shown in FIG. 5, the sealing situation performed by the flexible folding circular valve strengthens the connecting of the pipe.

I claim:

1. A pipe coupling for joining ends of pipes, one of the pipe ends defining a chamber having an open end, a longitudinal axis and adapted to receive a pipe end therein, the coupling comprising:
   a) a lock ring located within the chamber and means attaching said lock ring in said chamber so that said lock ring is axially fixed therein, the lock ring having a portion defining teeth thereon;
   b) a releasable ring located within the chamber, the releasable ring having indented portion means engagable with the teeth on the lock ring so as to permit axial movement of the releasable ring away from the lock ring, but prevent axial movement of the releasable ring towards the lock ring;
   c) a forcing ring means located in the chamber having a plurality of radially inwardly projecting teeth thereon adapted to grip a pipe end inserted into the chamber;
   d) seal means operatively interposed between the releasable ring and the forcing ring means and adapted to seal against a pipe end inserted into the chamber; and,
   e) an inflatable member operatively interposed between the lock ring and the releasable ring such that inflation of the inflatable member causes axial movement of the releasable ring away from the lock ring wherein such axial movement of the releasable ring exerts a force on the forcing ring means thereby urging the projection teeth to grip a pipe end inserted into the chamber.

2. The pipe coupling of claim 1 further comprising a removable locking pin operatively engaging the releasable ring so as to prevent axial movement and which is removed to allow said axial movement of said releasable ring.

3. The pipe coupling of claim 1 wherein the seal means comprises a deformable ring member.

4. The pipe coupling of claim 3 further comprising clamping ring means operatively interposed between the releasable ring and the deformable ring member for engaging the inserted pipe end and the chamber.

5. The pipe coupling of claim 3 wherein the deformable ring member is hollow.

6. The pipe coupling of claim 1 further comprising an air valve operatively associated with the inflatable member.

* * * * *